United States Patent [19]

Bory

[11] Patent Number: 4,796,329
[45] Date of Patent: Jan. 10, 1989

[54] FAUCET HANDLE
[75] Inventor: Steven Bory, River Forest, Ill.
[73] Assignee: Injecto Mold, Chicago, Ill.
[21] Appl. No.: 29,624
[22] Filed: Mar. 24, 1987
[51] Int. Cl.$^4$ .............................................. B25G 1/10
[52] U.S. Cl. .................. 16/121; 16/DIG. 30
[58] Field of Search ................. 16/121, DIG. 30; 137/606; 251/191

[56] References Cited

U.S. PATENT DOCUMENTS

| | | | |
|---|---|---|---|
| 3,313,057 | 4/1967 | Leddy | 16/121 |
| 3,396,604 | 8/1968 | Samuels et al. | 16/121 |
| 3,487,496 | 1/1970 | Guyton et al. | 16/121 |
| 3,543,329 | 12/1970 | Gulette et al. | 16/121 |
| 4,616,673 | 10/1986 | Bondar | 16/121 |

FOREIGN PATENT DOCUMENTS

| | | | |
|---|---|---|---|
| 2481405 | 10/1981 | France | 16/121 |
| 1527672 | 10/1978 | United Kingdom | 16/121 |

Primary Examiner—Fred A. Silverberg
Assistant Examiner—Edward A. Brown
Attorney, Agent, or Firm—Pigott & Gerstman, Ltd.

[57] ABSTRACT

A faucet handle is disclosed having a light-transmissive upper portion (10) and an opaque lower portion (16) which is connected to the handle hardware. In order to prevent viewing of the lower portion and the hardware through the light-transmissive upper portion, an opaque insert (26) is interposed between the upper portion and the lower portion. The upper portion comprises a unitary one-piece molding in which the top and downwardly depending skirt which form the upper portion are formed integrally in order to prevent detachment of the top (12) from the skirt (14). A projection (39) extends downwardly from the top at a central location thereof for carrying a color (40) which is applied to the underside of the projection, which color indicates cold or hot.

20 Claims, 1 Drawing Sheet

FAUCET HANDLE

FIELD OF THE INVENTION

The present invention concerns a novel and attractive faucet handle.

BACKGROUND OF THE INVENTION

Faucet handles used in public areas are occasionally stolen, particularly if they are decorative and attractive. Often a top disc may be removed and the handle can be disconnected from the handle hardware by using a screwdriver. In some installations, the bolt for connecting the handle to the handle hardware is directly accessible from the top of a handle and the handle may be removed simply with a screwdriver.

It is desirable in many public installations and the like for faucet handles to be decorative and attractive, yet be very difficult for the public to remove. To this end, the faucet handles may be attached to the handle hardware without the use of external bolts. I have discovered a novel and attractive handle which does not permit access to handle hardware from the top of the handle, yet which can utilize a light-transmissive upper portion having an attractive appearance.

It is, therefore, an object of the present invention to provide a faucet handle that is attractive in appearance and does not enable access to the handle hardware from the top of the faucet handle.

Another object of the present invention is to provide an attractive faucet handle that is simple in construction and relatively easy to manufacture.

A still further object of the present invention is to provide a faucet handle having a light-transmissive upper portion while at the same time it does not enable the user to view the handle hardware.

Other objects and advantages of the present invention will become apparent as the description proceeds.

SUMMARY OF THE INVENTION

In accordance with the present invention, a novel faucet handle is provided having a light-transmissive upper portion with a top and downwardly depending skirt. A lower portion is connected to the upper portion, with the lower portion having an outer peripheral wall, an inward member and a central sleeve for connection to handle hardware. Means are interposed between the light-transmissive upper portion and the lower portion to prevent viewing of the lower portion through the light-transmissive upper portion.

In the illustrative embodiment, the viewing prevention means comprises an opaque insert interposed between the upper portion and the lower portion. The opaque insert has a top and a downwardly depending skirt that conforms with the downwardly depending skirt of the upper portion and is surrounded by the downwardly depending skirt of the upper portion.

In another embodiment, the viewing prevention means comprises an opaque coating on the underside of the upper portion.

In the illustrative embodiments, the upper portion comprises a unitary one-piece molding in which the top and downwardly depending skirt are formed integrally to prevent detachment of the top from the skirt. The top is convex and the skirt is generally cylindrical. A projection extends downwardly from the top at a central location thereof for carrying indicium on its underside, and indicium is hot stamped on the underside of the projection for designating whether it is a cold or hot faucet.

In the illustrative embodiment, the lower portion is opaque and the upper portion is connected to the lower portion by ultrasonic welding.

A more detailed explanation of the invention is provided in the following description and claims, and is illustrated in the accompanying drawings.

DETAILED DESCRIPTION OF THE ILLUSTRATIVE EMBODIMENTS

Figure 1:
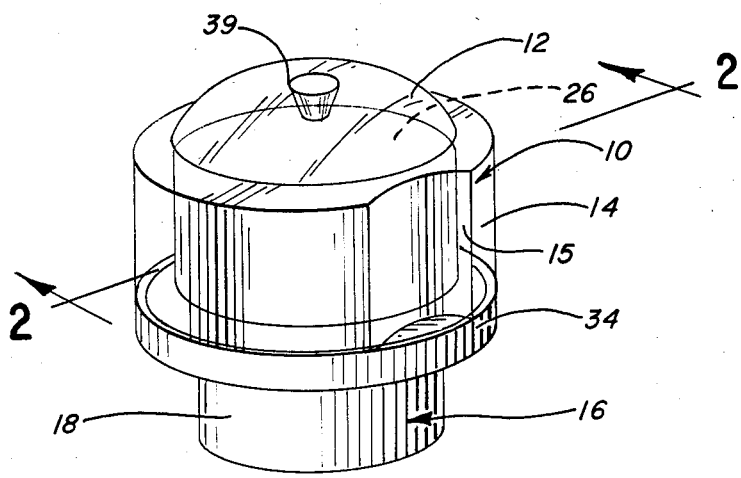
FIG. 1 is a perspective view of a faucet handle constructed in accordance with the principles of the present invention.

Referring to the Figures, the faucet handle shown therein includes an upper portion 10 that is formed as a unitary one-piece molding using a transparent plastic material, preferably a polycarbonate or an acrylic. Upper portion 10 includes a convex top 12 and a downwardly depending skirt 14. Skirt 14 defines a thumb groove 15.

The handle also includes a one-piece molded lower portion 16, preferably formed of polycarbonate for strength, and having an outer peripheral wall 18 that is generally cylindrical, an inward member 20 and a central sleeve 22 which carries appropriate grooving for connection to handle hardware. The grooving of sleeve 22 may be such that relatively difficult manipulations are required in order to remove lower portion 16 from the handle hardware.

The portion 24 of lower portion 18 which extends within upper portion 10 has a smaller outer diameter than the inner diameter of the upper portion so that portion 24 fits inside the upper portion 10 with a space for an insert 26. Insert 26 is opaque and utilized to prevent viewing of the handle hardware through the transparent upper portion 10. Insert 26 has a top 28 and a downwardly depending cylindrical skirt 30 which conforms with the downwardly depending cylindrical skirt 14 of upper member 10 and is surrounded by the downwardly depending skirt 14. Insert 26 may be formed of an aluminum stamping, or it may be formed of another material and coated with a metal such as aluminum, silver or gold, etc. The metalized coating may be applied by vacuum deposition.

Lower portion 16 has a peripheral rim 34 which extends outwardly. The top 36 of peripheral rim 34 is ultrasonically welded to the bottom 38 of skirt 14. It is understood that other connection means which could connect rim 34 and skirt 14 may be utilized, if desired.

Top 12 has a projection 39 which extends downwardly from top 12 at a central position thereof. Projection 39 is formed integrally with the top 12 and skirt 14 in the molding process. In order to designate whether the faucet handle is being used in connection with cold water or hot water, indicium 40 is applied to the underside of projection 38. For example, blue paint may be hot stamped to the underside of projection 39 to designate cold and red paint may be hot stamped to designate hot.

Figure 2:
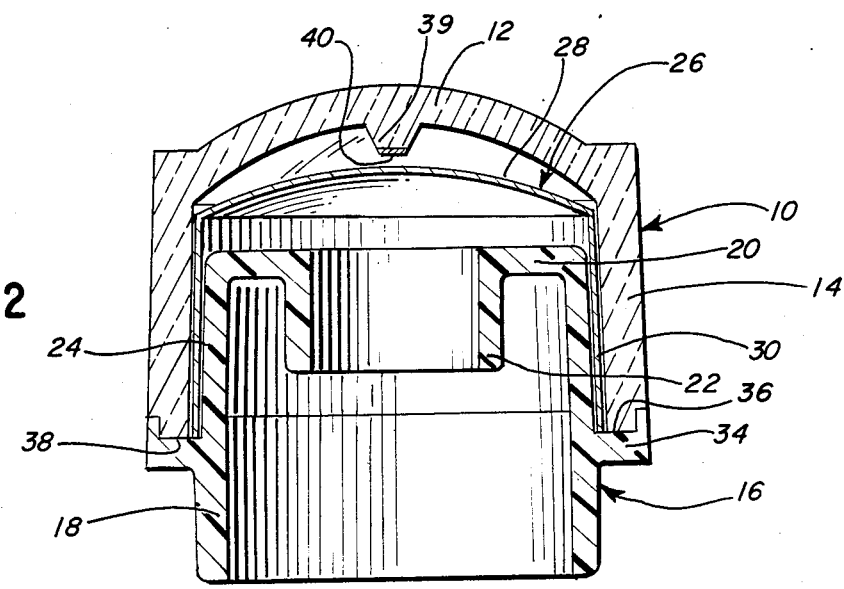
FIG. 2 is a cross-sectional elevation thereof, taken along the plane of the line 2—2 of FIG. 1.
Figure 3:
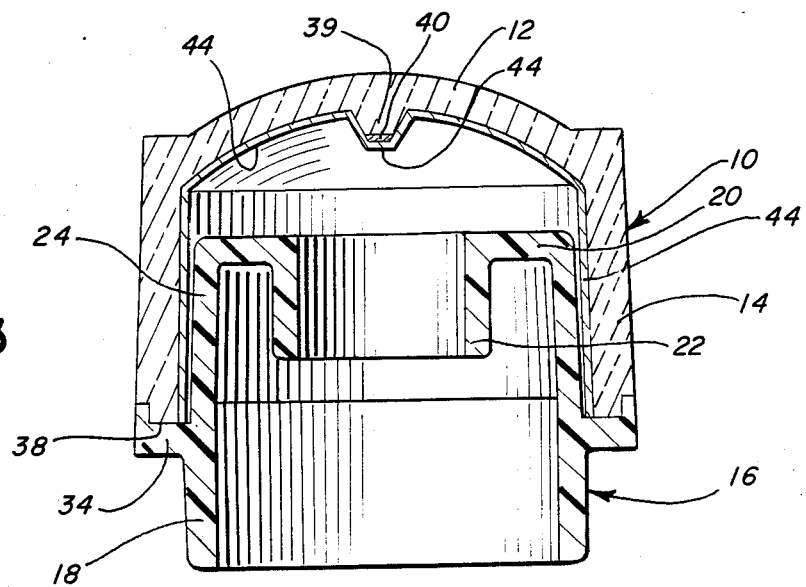
FIG. 3 is a cross-sectional elevation similar to FIG. 2, but showing another embodiment of the present invention.

The embodiment illustrated in FIG. 3 is similar to the FIG. 2 embodiment, except that there is no insert provided between upper portion 10 and lower portion 16. In place thereof, a metalized coating 44 is applied, preferably by vacuum deposition, to the inside of upper portion 10. Preferably the indicium 40 is applied prior to the application of the metalized coating 44 so that the metalized coating 44 will overlie the indicium 40 (i.e., it will be spaced from projection 39 by indicum 40).

It can be seen that a novel faucet handle has been described which is attractive in appearance yet relatively easy to manufacture, and which uses a transparent upper portion material yet prevents viewing of the handle portion material and the handle hardware through the transparent upper portion material.

Although two illustrative embodiments of the invention have been shown and described, it is to be understood that various modifications and substitutions may be made by those skilled in the art without departing from the spirit and scope of the present invention.

What is claimed is:

1. A faucet handle which comprises:
   a light-transmissive upper portion having a top and a downwardly depending skirt;
   a lower portion connected to the upper portion, the lower portion having a top with an outer peripheral wall that extends downwardly from the top and has an outer diameter that is less than the inner diameter of said skirt;
   said lower portion top having a central sleeve extending downwardly therefrom for connection to faucet handle hardware;
   said central sleeve having its lowest extremity lying in a plane that is above the plane of the lowest extremity of said lower portion;
   means interposed between the light-transmissive upper portion and the lower portion to prevent viewing of the lower portion through the light-transmissive upper portion whereby viewing of the faucet handle hardware connected to said central sleeve is prevented.

2. A faucet handle as described in claim 1, said viewing prevention means comprising an opaque insert interposed between the upper portion and the lower portion.

3. A faucet handle as described in claim 2, said opaque insert having a top, and a downwardly extending skirt that conforms with the downwardly depending skirt of the upper portion and is surrounded by the downwardly depending skirt of the upper portion.

4. A faucet handle as described in claim 2, said opaque insert being formed of metal.

5. A faucet handle as described in claim 2, said opaque insert being coated with metal.

6. A faucet handle as described in claim 1, said viewing prevention means comprising an opaque coating on the underside of the upper portion.

7. A faucet handle as described in claim 1, said top having indicium applied to its underside in a central location thereof.

8. A faucet handle as described in claim 7, said indicium comprising either a blue indicium for indicating cold or a red indicium for indicating hot.

9. A faucet handle as described in claim 7, said viewing prevention means comprising an opaque coating on the underside of the upper portion, overlying the indicium.

10. A faucet handle as described in claim 1, in which the upper portion comprises a unitary one-piece molding in which the top and downwardly depending skirt are formed integrally to prevent detachment of the top from the skirt.

11. A faucet handle as described in claim 10, in which the top is convex and the skirt is generally cylindrical.

12. A faucet handle as described in claim 1, in which the upper portion is connected to the lower portion by ultrasonic welding.

13. A faucet handle as described in claim 1, in which the lower portion is opaque.

14. A faucet handle which comprises:
   a light-transmissive upper portion having a top and a downwardly depending skirt;
   an opaque lower portion connected to the upper portion, the lower portion having an outer peripheral wall, an inward member and a central sleeve for connection to handle hardware;
   means interposed between the light-transmissive upper portion and the opaque lower portion to prevent viewing of the opaque lower portion through the light-transmissive upper portion;
   said viewing prevention means comprising an opaque insert interposed between the upper portion and the lower portion, said opaque insert having a top and a downwardly depending skirt that conforms with the downwardly depending skirt of the upper portion and is surrounded by the downwardly depending skirt of the upper portion;
   the upper portion comprising a unitary one-piece molding in which the top and downwardly depending skirt are formed integrally to prevent detachment of the top from the skirt; and
   said top having indicium applied to its underside at a central location thereof, the top being convex and the skirt being generally cylindrical; and further including a projection extending downwardly from the top at a central location thereof for carrying the indicium on its underside, and with the indicium applied to the underside of the projection.

15. A faucet handle as described in claim 14, said indicium comprising either a blue indicium for indicating cold or a red indicium for indicating hot.

16. A faucet handle which comprises:
   a light-transmissive upper portion having a top and a downwardly depending skirt;
   an opaque lower portion connected to the upper portion, the lower portion having an outer peripheral wall, an inward member and a central sleeve for connection to handle hardware;
   means interposed between the light-transmissive upper portion and the opaque lower portion to prevent viewing of the opaque lower portion through the light-transmissive upper portion;
   said viewing prevention means comprising an opaque insert interposed between the upper portion and the lower portion, said opaque insert having a top and a downwardly depending skirt that conforms with the downwardly depending skirt of the upper portion and is surrounded by the downwardly depending skirt of the upper portion;
   the upper portion comprising a unitary one-piece molding in which the top and downwardly depending skirt are formed integrally to prevent detachment of the top from the skirt; and
   said top having indicium applied to its underside at a central location thereof, the upper portion being connected to the lower portion by ultrasonic welding.

17. A faucet handle which comprises:
a light-transmissive upper portion having a top and a downwardly depending skirt;
the upper portion comprising a unitary one-piece molding in which the top and downwardly depending skirt are formed integrally to prevent detachment of the top from the skirt;
a projection extending downwardly from the top at a central location thereof for carrying indicium on its underside;
indicium applied to the underside of the projection;
an opaque lower portion connected to the upper portion, the lower portion having an outer peripheral wall, an inward member and a central sleeve for connection to handle hardware; and
an opaque coating on the underside of the upper portion to prevent viewing of the lower opaque lower portion through the light-transmissive upper portion.

18. A faucet handle as described in claim 17, said indicium comprising either a blue indicium for indicating cold or a red indicium for indicating hot.

19. A faucet handle which comprises:
a light-transmissive upper portion having a top and a downwardly depending skirt, said upper portion comprising a unitary one-piece molding in which the top and downwardly depending skirt are formed integrally to prevent detachment of the top from the skirt, said to being convex and said skirt being generally cylindrical;
a projection extending downwardly from the top at a central location thereof for carrying indicium on its underside, an indicium applied to the underside of the projection;
a lower portion connected to the upper portion, the lower portion having an outer peripheral wall, an inward member and a central sleeve for connection to handle hardware;
means interposed between the light-transmissive upper portion and the lower portion to prevent viewing of the lower portion through the light-transmissive upper portion.

20. A faucet handle which comprises:
a light-transmissive upper portion having a top and a downwardly depending skirt, the upper portion comprising a unitary one-piece molding in which the top and downwardly depending skirt are formed integrally to prevent detachment of the top from the skirt, the top being convex and the skirt being generally cylindrical;
a lower portion connected to the upper portion, the lower portion having an outer peripheral wall, an inward member and a central sleeve for connection to handle hardware;
the lower portion having a smaller outer diameter than the inner diameter of the upper portion whereby a part of the lower portion fits inside the upper portion, the lower portion carrying a peripheral rim extending outwardly with the bottom of the upper portion skirt being connected to the peripheral rim;
means interposed between the light-transmissive upper portion and the lower portion to prevent viewing of the lower portion through the light-transmissive upper portion.

* * * * *